United States Patent [19]

Brown

[11] 4,267,089

[45] May 12, 1981

[54] ADHERENT, FLAME-RESISTANT ACRYLIC DECORATIVE COATING COMPOSITION FOR WALL BOARD AND THE LIKE

[75] Inventor: William F. Brown, Wausau, Wis.

[73] Assignee: Weston Research Corporation, Wausau, Wis.

[21] Appl. No.: 959,309

[22] Filed: Nov. 9, 1978

[51] Int. Cl.$^3$ .............................................. C08L 33/08
[52] U.S. Cl. ..................... 260/29.6 MM; 260/29.6 S; 260/45.7 R; 260/45.75 F; 428/522
[58] Field of Search .................. 260/29.6 S, 29.6 MM

[56] References Cited

U.S. PATENT DOCUMENTS

| | | | |
|---|---|---|---|
| 3,025,256 | 3/1962 | Janota et al. | 260/29.6 S |
| 3,297,616 | 1/1967 | Fisher et al. | 260/29.6 MM |

*Primary Examiner*—Harold D. Anderson
*Attorney, Agent, or Firm*—Michael, Best & Friedrich

[57] ABSTRACT

A coating composition, particularly adapted for providing a flame-resistant, decorative finish coating on walls constructed from wall board, comprising an aqueous dispersion containing nepheline syenite, aluminum hydrate, sodium silicate, wollastonite, titanium dioxide, an acrylic resin, zinc oxide, hydrated magnesium aluminum silicate and water, and optionally an anti-foaming agent and a dispersing agent. The coating composition can be painted onto the wall surface and is capable of "hiding" relatively deep surface indentations with one coat.

3 Claims, No Drawings

ADHERENT, FLAME-RESISTANT ACRYLIC DECORATIVE COATING COMPOSITION FOR WALL BOARD AND THE LIKE

BACKGROUND OF THE INVENTION

This invention relates to coating compositions and, more particularly, to coating compositions adapted to provide a decorative finish on walls constructed from wall board and the like.

The surfaces of walls constructed from wall board, such as gypsum wall board and Upson wall board (pressed fiber board), typically are covered with an interior paint for decorative purposes. Panels of the wall board usually are installed with nails, the heads of which are driven into the board for hiding (particularly gypsum board) and the resulting depression is filled with a filler or putty material prior to painting. If the nail heads are left exposed and covered only by paint, any rust forming on the nail heads tends to bleed through most conventional interior paints, causing surface discoloration. Conventional interior paints usually have relatively poor flame resistance and provide a relatively soft coating which is vulnerable to damage by articles striking the walls during normal usage conditions. When a textured finish is desired, the paint usually includes some type of aggregate, such as sand, pumice or the like, as an additional ingredient for this purpose.

SUMMARY OF THE INVENTION

A principal object of the invention is to provide an inexpensive, flame-resistant coating composition which is particularly adaptable for use as a decorative finish on walls constructed from wall board.

Another object of the invention is to provide such a coating composition which is capable of providing a highly adherent, textured finish having a high surface hardness and yet is resistant to stress cracking.

A further object of the invention is to provide such a coating composition which can be applied at a sufficient thickness in one coat to fill and cover ordinary nail head holes and similar surface indentations without first filling the holes.

A still further object of the invention is to provide a water-based coating composition which can be conveniently applied to a variety of substrates.

Other objects, aspects and advantages of the invention will become apparent to those skilled in the art upon reviewing the following detailed description and the appended claims.

The coating composition of the invention comprises an aqueous dispersion containing nepheline syenite, aluminum hydrate, sodium silicate, wollanstonite, titanium dioxide, an acrylic resin, zinc oxide, and water, and optionally, small amounts of an anti-foaming agent and a dispersing agent. A single coat of the coating composition can be conveniently applied to the surfaces of walls constructed from a wall board to provide a hard, textured decorative finish having sufficient thickness to fill or "hide" ordinary nail head holes and similar indentations in the wall surface. The coating has excellent flame-resistance properties and prevents any rust forming on the nails from bleeding therethrough and causing discoloration.

DESCRIPTION OF THE PREFERRED EMBODIMENTS

The coating composition can be used on a variety of substrates. It is particularly adaptable for use as a decorative finish on wall board materials, such as gypsum board and Upson board, and will be described in conection with that use.

While the coating composition can include different amounts of the ingredients, the preferred formulation is as follows:

| INGREDIENT | PERCENTAGE OF TOTAL WEIGHT |
|---|---|
| Nepheline syenite | about 8 to about 20 |
| Aluminum hydrate | about 2 to about 20 |
| Sodium silicate | about 4 to about 15 |
| Wollastonite | about 3 to about 11 |
| Titanium dioxide | about 1 to about 5 |
| Acrylic resin | about 0.2 to about 4 |
| Zinc oxide | about 0.2 to about 5 |
| Hydrated magnesium aluminum silicate | about 0.01 to about 2 |
| Anti-foaming agent | 0 to about 2 |
| Dispersing agent | 0 to about 2 |
| Water | about 20 to about 80 |

While the total effect of each ingredient in the overall combination and its interrelationship with the other ingredients are not completely understood, some general observations have been made.

Nepheline syenite is a blend of naturally occurring materials and contains approximately 18 different identifiable substances, primarily sodium and potassium aluminum silicates. Nepheline syenite functions as a binder and a thermal barrier. It is mined in Ontario, Canada and is commercially available in finely ground form from Chem-Materials of Akron, Ohio under the name MINEX. A 50/50 mixture of two such materials, MINEX No. 4 and MINEX No. 7, is preferred.

Aluminum hydrate, which is practically insoluble in water, enhances the flame resistance of the coating.

Sodium silicate, which preferably is used in the form of a commercially available solution (e.g., aqueous solution containing 40% $Na_2Si_3O_7$ such as Du Pont's JM) serves primarily as a binding agent to improve adherence of the coating to the substrate. It also enhances the flame and moisture resistance of the coating.

Wollastonite is a natural form of calcium silicate and is available as a fibrous or fine granular cyrstalline material from Harwick Chemical Company of Elk Grove Village, Illinois. It is water insoluble and has a melting point of about 1540° F. It adds tensile strength to the coating and also serves as a heat insulator and a binder.

Titanium dioxide serves primarily as a pigment (white) and a flame-resistant filler. Titanium dioxide can withstand elevated temperatures without shrinkage and assists in preventing cracking of the coating when exposed to elevated temperatures.

Various commercially available acrylic resins commonly used in latex paint formulations can be used, such as Acryloid coating resin (acrylic ester polymers) solutions marketed by Rohn & Haas UCAR 366 marketed by Union Carbide (an acrylic resin synthetic latex emulsion). These acrylic resins typically are available as an emulsion or dispersion containing 30–40% solids and this is the preferred form. The acrylic resin imparts elasticity or flexibility to the coating and thereby minimizes stress cracking. The acrylic resin also acts as a binding agent and, because of its composition, remains functional to temperatures as low as −20° F.

Zinc oxide masks the titanium dioxide and other ingredients which tend to degrade upon exposure to ultraviolet light, thereby inhibiting degradation of the resulting coating by ultraviolet light. It also enhances the flame resistance of the coating.

Hydrated magnesium aluminum silicate serves primarily as a thixotropic agent for making the coating composition sufficiently viscous to facilitate application of a reasonably thick layer on vertical or inverted horizontal surfaces without running and yet fluid enough, upon application of shearing forces, to permit convenient application by brushing, rolling, spraying and the like. Hydrated magnesium aluminum silicate also adds to the flame resistance and improves the hardness of the coating.

The coating composition tends to foam during mixing and handling without the exercise of some care. Accordingly, a small amount of a suitable anti-foaming agent preferably is included in the coating composition. Various commercially available anti-foaming agents commonly employed in latex paints and similar water-based coating compositions can be used. Silicone-base anti-foaming agents, such as LG 61 marketed by BASF Wyandotte, generally are preferred.

While not absolutely necessary if the coating composition is thoroughly stirred and applied before the water-insoluble ingredients start to settle a dispersing agent preferably is included to form a stable dispersion or suspension of the water-soluble ingredients in the aqueous phase. Various conventional dispersing agents, preferably anionic or non-ionic types, commonly employed in latex paints and similar water-based coating compositions for dispersing insoluble polymers, pigments, and the like can be used. Suitable commercially available dispersing agents include Triton X-100 and Tamol 731 marketed by Rohm & Haas.

The solid ingredients, particularly nepheline syenite, wollastonite, titanium dioxide, and zinc oxide, should have a particle size sufficiently small to facilitate uniform dispersion therof during mixing. Also, smaller particles of these ingredients, particularly titanium dioxide, tend to produce less shrinkage upon drying. Generally, the particle size of the solid ingredients can be about 200 to about 400 screen mesh. Best results usually are obtained with a particle size of about 280 to about 320 screen mesh.

The consistency of the coating composition can be varied, from a paint-like consistency best suited for application by spraying, rolling or brushing to a plaster-like consistency best suited for application with a trowel or the like, by varying the water content within the above range.

A coating composition particularly adaptable for use as a flame-resistant, decorative finish for gypsum or Upson wall board and application with a conventional paint roller has the following formulation:

| INGREDIENT | PERCENT OF TOTAL WEIGHT |
| --- | --- |
| Nepheline syenite | about 14 |
| Aluminum hydrate | about 11 |
| Sodium silicate | about 8 |
| Wollastonite | about 7 |
| Titanium dioxide (rutile) | about 2 |
| Acrylic resin | about 2 |
| Zinc oxide | about 0.9 |
| Hydrated magnesium aluminum silicate | about 0.05 |
| Anti-foaming agent | about 0.03 |
| Dispersing agent | about 0.02 |
| Water | about 55 |

The coating composition can be prepared by any suitable procedure whereby the ingredients are uniformly dispersed throughout. In a preferred procedure, sodium silicate (as a 40% aqueous solution), the acrylic resin (as a resin or dispersion containing 30–40% solids), the water and titanium dioxide are first added to a high speed blender, such as a Cowls blender or the equivalent, and mixed at a blender speed of about 1800 rpm for about 5 to about 15 minutes. The remaining ingredients are then added and mixing is continued for another 30 minutes to 3 hours or more.

The resulting dispersion or suspension usually heats up to about 180° F. during mixing. After cooling, it is ready for application.

The thickness of the coating applied depends primarily upon the water content of the coating composition and the method of application. There is some expansion of the coating composition after application so the final coating usually is about 20–28% thicker than at the time of application. It has been found that a single coat of a coating composition having a paint-like consistency and applied with a conventional paint roller can "hide" surface indentations up to about 90 mils deep.

The coating dries to a completely hardened state within about 2 to about 4 hours, depending on the ambient humidity and temperature.

Without further elaboration, it is believed that one skilled in the art can, using the preceding discription, utilize the present invention to its fullest extent.

The following example is presented to exemplify a preferred embodiment of the invention and should not be construed as a limitation thereof.

EXAMPLE 467 gallons of a coating composition of the invention adapted for covering gypsum and Upson wall board was prepared in accordance with the following formulation:

| INGREDIENT | AMOUNT, lbs. |
| --- | --- |
| Nepheline syenite | |
| MINEX No. 7[1] | 200 |
| MINEX No. 4[1] | 200 |
| Aluminum hydrate | 300 |
| Sodium silicate[2] (aqueous solution-40% $Na_2Si_3O_7$) | 560 |
| Wollastonite | 200 |
| Titanium dioxide (rutile) | 50 |
| Acrylic resin emulsion[3] (34% solids) | 126 |
| Zinc oxide | 50 |
| Hydrated magnesium aluminum silicate[4] | 1.8 |
| Anti-foaming agent[5] | 12 oz. |
| Dispersing agent[6] | 11 oz. |
| Water | 1549.4 |

| INGREDIENT | AMOUNT, lbs. |
|---|---|
| -continued | |
| | (186 gal.) |

Notes:
(1) Marketed by Chem-Materials, Akron, Ohio
(2) Du Pont JM
(3) UCAR 366 (an acrylic resin synthetic latex emulsion) marketed by Union Carbide
(4) ATTAGEL marketed by Minerals & Chemical Corp. of America
(5) LG 61, silicone-base, anti-foaming agent marketed by BASF Wyandotte Corp.
(6) TRITON X-100 marketed by Rohn & Haas The sodium silicate solution, acryloid coating resin dispersion, water and titanium dioxide were added to a high-speed Cowls blender having a high dispersion blade and mixed at a speed of about 1800 rpm for approximately 5 minutes. The remaining ingredients were added with the dispersion blade operating and blending was continued for approximately 2 hours.

After cooling, the thus-prepared coating composition was applied with a conventional paint roller to the surfaces of walls constructed from 4 ft.×8 ft. panels of gypsum wall board nailed onto 2 in.×4 in. wood wall studs. The unfilled nail head indentations were completely "hidden" by one coat of the coating composition. The coating, which dried to a hardened state in about 1½–2 hours, had a decorative, textured finish. The coating was highly resistant to acids and alkalines and exhibited only mild degradation by aromatic hydrocarbons. The coating composition was non-toxic and had a pH of 7.5 to 9.

Tests have demonstrated that the coating does not support combustion and is completely inflammable. Hardness tests were performed on 12 samples and the finish had a Barcol hardness on the "D" scale of 71 to 82. Samples of a variety of materials were coated with the coating composition and completely submerged in water for approximately 120 hours with minimal, if any, water absorption.

From the foregoing description, one skilled in the art can easily ascertain the essential characteristics of the invention and, without departing from the spirit and scope thereof, can make various changes and modifications to adapt it to various usages and conditions.

I claim:

1. A coating composition for covering the surface of a substrate and providing an adherent, flame-resistant coating thereon comprising an aqueous dispersion containing nepheline syenite, aluminum hydrate, sodium silicate, wollastonite, titanium dioxide, an acrylic resin, zinc oxide, and hydrated magnesium aluminum silicate.

2. A coating composition according to claim 1 wherein said aqueous dispersion contains about 8 to about 20 weight % nepheline syenite, about 2 to about 20 weight % aluminum hydrate, 4 to about 15 weight % sodium silicate, about 3 to about 11 weight % wollastonite, about 1 to about 5 weight % titanium dioxide, about 0.2 to about 4 weight % of an acrylic resin, about 0.2 to about 5 weight % zinc oxide, about 0.01 to about 3 weight % of hydrated magnesium aluminum silicate, 0 to about 2 weight % of an anti-foaming agent, 0 to about 2 weight % of a dispersing agent and about 20 to about 80 weight % water, all based on the total weight of said aqueous dispersion.

3. A coating composition according to claim 2 wherein said aqueous dispersion contains about 14 weight % nepheline syenite, about 11 weight % aluminum hydrate, about 8 weight % sodium silicate, about 7 weight % wollastonite, about 2 weight % titanium dioxide, about 2 weight % of an acrylic resin, about 0.9 weight % zinc oxide, about 0.05 weight % hydrated magnesium aluminum silicate, about 0.3 weight % of an anti-foaming agent, about 0.3 weight % of an anti-foaming agent, about 0.02 weight % of a dispersing agent and about 55 weight % water.

* * * * *